United States Patent Office 2,809,215
Patented Oct. 8, 1957

2,809,215
HIGHER ALIPHATIC KETONE

Joseph Donald Surmatis, Pompton Plains, and Joseph Weber, Paterson, N. J., assignors to Hoffmann-La Roche Inc., Nutley, N. J., a corporation of New Jersey No Drawing. Application September 30, 1954,
Serial No. 459,509

1 Claim. (Cl. 260—593)

The present invention relates to novel chemical compounds and to their preparation and use. More particularly, it relates to 6,10,14-trimethyl-5,9-pentadecadien-2-one, the preparation thereof, and the conversion thereof to an intermediate useful in the synthesis of isophytol, vitamin E and vitamin K. The invention therefore finds an important application in the pharmaceutical industry.

One comprehensive aspect of the invention relates to a novel process which comprises halogenating 3,7,11-trimethyl-1,6-dodecadien-3-ol to produce 1-halo-3,7,11-trimethyl-2,6-dodecadiene, condensing the latter with a lower alkyl acetoacetate and subjecting the condensation product to ketonic scission to produce 6,10,14-trimethyl-5,9-pentadecadien-2-one, and completely hydrogenating the olefinic unsaturation of the latter.

The first step in the novel process comprises halogenating 3,7,11-trimethyl-1,6-dodecadien-3-ol. This halogenation can be effected in various ways, e. g. by reacting the alcohol with phosphorus tribromide or with anhydrous hydrogen chloride or with anhydrous hydrogen bromide, thereby producing the corresponding 1-halo-3,7,11-trimethyl-2,6-dodecadiene. A preferred method comprises reacting 3,7,11-trimethyl-1,6-dodecadien-3-ol with commercial concentrated aqueous hydrohalic acid at approximately room temperature. In this mode of execution, it is advantageous to use commercial concentrated hydrochloric acid of approximately 37 per cent concentration by weight or commercial concentrated hydrobromic acid of approximately 48 per cent concentration by weight.

The next step comprises converting the 1-halo-3,7,11-trimethyl-2,6-dodecadiene, produced in the preceding operation, by an acetoacetic ester synthesis to 6,10,14-trimethyl-5,9-pentadecadien-2-one. Essentially, this step comprises reacting 1-halo-3,7,11-trimethyl-2,6-dodecadiene with a lower alkyl acetoacetate (preferably ethyl acetoacetate or methyl acetoacetate) in the presence of an alkaline condensation agent (preferably an alkali metal such as sodium or potassium, or an alkali metal lower alkoxide such as sodium methylate or potassium ethylate) and subjecting the intermediate ester formed, i. e. 3-lower-carbalkoxy-6,10,14-trimethyl-5,9-pentadecadien-2-one, to ketonic scission thereby producing 6,10,14-trimethyl-5,9-pentadecadien-2-one. Said scission can be effected by hydrolysis and decarboxylation of said intermediate ester, e. g. by saponifying the latter with dilute aqueous alkali metal hydroxide solution (preferably dilute potassiumhydroxide or dilute sodium hydroxide) thereby producing the corresponding alkali metal salt of 3-carboxy-6,10,14-trimethyl-5,9-pentadecadien-2-one, and heating the latter salt in acidic aqueous solution.

The final step of the comprehensive process above referred to comprises completely hydrogenating the olefinic unsaturation of 6,10,14-trimethyl-5,9-pentadecadien-2-one. A preferred mode of execution comprises catalytic hydrogenation of said pentadecadienone, e. g. by high pressure hydrogenation using a palladium catalyst.

The starting material 3,7,11-trimethyl-1,6-dodecadien-3-ol and the preparation thereof do not constitute a part of the presently claimed invention, but said subject matter is herewith set out in detail, in order that the disclosure of the claimed invention may be complete:

PREPARATION OF 3,7,11-TRIMETHYL-1,6-DODECADIEN-3-OL

To 280 g. of the known compound 3,7-dimethyl-1-octen-3-ol, with stirring, was added 1560 cc. of 37 percent aqueous hydrochloric acid. The addition was done at room temperature, and required 30 minutes. The mixture was stirred an additional 45 minutes. The oil was removed by means of a separatory funnel and washed three times with 500 cc. of water. After drying over calcium chloride, 313 g. of 1-chloro-3,7-dimethyl-2-octene was obtained, $n_D^{25}=1.4500$.

A five-liter, 3-neck flask, fitted with a stirrer, thermometer, condenser and dropping funnel, was charged with 1800 cc. of benzene and 305 g. of ethyl acetoacetate. To this was added, portionwise, 127 g. of sodium methylate. The temperature rose to 60° C. during the addition. After stirring 30 minutes, there was added dropwise, over a one hour period, 313 g. of 1-chloro-3,7-dimethyl-2-octene. The reaction mixture was warmed to 65–70° C. and stirred at that temperature for six hours. Then 2 liters of water was added. The aqueous phase was removed and the benzene layer washed twice with 200 cc. of water. The benzene was removed in vacuo leaving a syrupy intermediate condensation product.

To this condensation product there was added 1600 cc. of ethyl alcohol and a solution of 260 g. of potassium hydroxide in 300 cc. of water. This mixture was stirred at 50° C. for 4 hours. The solution was then acidified by adding 400 cc. of 37 percent aqueous hydrochloric acid over a one hour period. The reaction mixture was stirred at 60–70° C. for 2 hours. Four liters of water was added and the organic layer was separated. The aqueous layer was extracted three times with a total of 1 liter of benzene. The combined extracts and organic layer were dried over calcium chloride, the solvent was removed and the residue distilled through a Vigreux column. There was obtained 6,10-dimethyl-5-undecen-2-one boiling at 64–66° C./3 mm., having $n_D^{25}=1.4465$.

23 g. of metallic sodium was dissolved in one liter of liquid ammonia. Acetylene was bubbled into the stirred solution until its color changed from blue to white. 163 g. of 6,10-dimethyl-5-undecen-2-one was dissolved in 200 cc. of diethyl ether and dropped into the stirred reaction mixture in one hour. Stirring was then continued for 3 hours while a slow stream of acetylene was bubbled in. The stream of acetylene was then stopped but the stirring was continued for 15 hours. The ammonia was thereupon distilled off and the residue in the reaction vessel was washed with 2 liters of 5 percent aqueous sulfuric acid. The product was water washed, dried over anhydrous calcium sulfate and fractionated to yield 3,7,11-trimethyl-6-dodecen-1-yn-3-ol, distilling at 93–94° C./8 mm., $n_D^{25}=1.4609$.

108.2 g. (.49 mol) of 3,7,11-trimethyl-6-dodecen-1-yn-3-ol, 12 g. of 5 percent lead-palladium-calcium carbonate catalyst [Lindlar, Helvetica Chimica Acta 35, 446 (1952)] and 150 cc. of petroleum ether were placed in a flask equipped with a stirrer and hydrogenated at 25–30° C. at one atmosphere hydrogen pressure until 0.49 mol of hydrogen were consumed. Fractionation of the product gave 3,7,11-trimethyl-1,6-dodecadien-3-ol distilling at 98–100° C./1.0 mm., $n_D^{25}=1.4608$.

The starting material 3,7,11-trimethyl-1,6-dodecadien-3-ol can exist in geometrically isomeric forms. The invention includes the application of the claimed process to any of the stereoisomeric forms of the alcohol starting material, and includes as well all of the stereoisomeric forms of the intermediate ester, and of the ketone 6,10,14-trimethyl-5,9-pentadecadien-2-one, which are produced by the processes of this invention.

The invention is further disclosed in the following examples, which are illustrative but not limitative thereof:

Example 1

To 96.3 g. of 3,7,11-trimethyl-1,6-dodecadien-3-ol, with stirring, was added 348 cc. of 37 percent aqueous hydrochloric acid. The addition was done at room temperature and required 30 minutes. The mixture was stirred an additional hour. The oil was removed by means of a separatory funnel and washed three times, each time with 100 cc. of water. After drying over calcium chloride, 99 g. of 1-chloro-3,7,11-trimethyl-2,6-dodecadiene was obtained, $n_D^{25}=1.4740$.

Similarly, 1-bromo-3,7,11-trimethyl-2,6-dodecadiene can be prepared by reacting 3,7,11-trimethyl-1,6-dodecadien-3-ol with 48 percent aqueous hydrobromic acid at room temperature.

Example 2

A one-liter, 3-neck flask, fitted with a stirrer, thermometer, condenser and dropping funnel, was charged with 300 cc. of benzene and 75.5 g. of ethyl acetoacetate. To this was added portionwise, 34 g. of sodium methylate. The temperature rose to 60° C. during the addition. After stirring 30 minutes, there was added dropwise, over a 20 minute period, 99 g. of 1-chloro-3,7,11-trimethyl-2,6-dodecadiene. The reaction mixture was raised to 60–70° C. and stirred at that temperature for 12 hours. Then 500 cc. of water was added. The aqueous phase was removed and the benzene layer washed two times with 100 cc. of water. The benzene was removed in vacuo leaving a syrup comprising essentially 3-carbethoxy-6,10,14-trimethyl-5,9-pentadecadien-2-one.

To this syrup there was added 300 cc. of ethyl alcohol and a solution of 56 g. of potassium hydroxide in 100 cc. of water. This mixture was stirred at 50° C. for 4 hours. The resulting solution of potassium-6,10,14-trimethyl-5,9-pentadecadien-2-one-3-carboxylate was then acidified by adding 85 cc. of 37 percent aqueous hydrochloric acid over a 30 minute period. The reaction mixture was stirred at 60–70° C. for 5 hours. Two liters of water was added and the organic layer was separated. The aqueous layer was extracted three times with a total of 500 cc. of benzene. The combined extracts and organic layer were dried over calcium chloride, the solvent was removed and the residue distilled through a Vigreux column. There was obtained 6,10,14-trimethyl-5,9-pentadecadien-2-one boiling at 125° C./.2 mm., having $n_D^{25}=1.4645$.

Example 3

46.8 g. (about 0.18 mol) of 6,10,14-trimethyl-5,9-pentadecadien-2-one, 5 g. of 10 percent palladium-on-charcoal catalyst, and 100 cc. of ethyl alcohol were hydrogenated at 1000 lbs. hydrogen pressure and room temperature. The reduction proceeded rapidly until 0.34 mols of hydrogen were absorbed. The internal temperature rose to 46° C. Fractionation of the product gave 6,10,14-trimethyl-2-pentadecanone boiling at 123–124° C./.5 mm., $n_D^{25}=1.4430$.

6,10,14-trimethyl-2-pentadecanone is a known compound, and is known to be useful in the synthesis of isophytol.

We claim:
6,10,14-trimethyl-5,9-pentadecadien-2-one.

References Cited in the file of this patent

UNITED STATES PATENTS

| | | |
|---|---|---|
| 2,272,122 | Lee | Feb. 3, 1942 |
| 2,315,580 | Behnisch | Apr. 6, 1943 |
| 2,363,092 | Smith et al. | Nov. 11, 1944 |
| 2,604,482 | Austerweil | July 22, 1952 |

OTHER REFERENCES

Ruzicka et al.: Helv. Chim. Acta 22 (1939), 392–6.
Karrer et al.: Helv. Chim. Acta 26 (1943) 1741–5.
Simonsen et al.: The Terpenes, 2nd ed., v. 3, page 346 (1952).
Simonsen et al.: The Terpenes, vol. III (2nd ed.), pp. 122, 123 (1951).